UNITED STATES PATENT OFFICE.

ALFRED B. WALKER AND FRANKLIN P. WALKER, OF CINCINNATI, OHIO, ASSIGNORS OF ONE-HALF TO WILLIAM R. WOOD, OF CINCINNATI, OHIO.

VARNISHES AND OTHER LIKE MATERIALS AND PROCESS FOR PRODUCING SAME.

1,131,578. Specification of Letters Patent. Patented Mar. 9, 1915.

No Drawing. Application filed October 31, 1910. Serial No. 590,036.

*To all whom it may concern:*

Be it known that we, ALFRED B. WALKER and FRANKLIN P. WALKER, both citizens of the United States, residing at Cincinnati, in the county of Hamilton and State of Ohio, have invented certain new and useful Improvements in Varnishes and other like Materials and Process for Producing Same, of which the following is a specification.

Our invention relates to the production of a varnish base, as well as to the production of a new varnish, of which said base is an ingredient.

This new varnish is stable in character, suitable for all of the industrial uses to which varnishes are applied, and it may also be combined with pigments to make what are commonly known as lithographers' inks. So far as we are aware, the varnishes in common commercial usage for such purposes comprise a primary resinious base, which has inherently certain undesirable physical characteristics, which are eliminated in my new varnish.

It is therefore broadly the object of this invention to produce a substitute for a resinous varnish base, which will retain all of the desirable or necessary varnish characteristics, and which will not have those undesirable properties inherent in a varnish formed of a resinious base.

This invention comprises not only the varnish and the varnish base, as new articles of manufacture, but it comprises the process involved in making the same.

The particular object of this invention is to provide a substance or a series of substances replacing the several gums or fossil resins used in preparing varnishes, readily soluble in turpentine (oil of turpentine), in the volatile products of petroleum and in other solvents of oils and fatty bodies, the solutions having the consistency and flowing qualities of varnishes as now used for a variety of purposes.

Regardless of price values, varnishes as now made and used have certain inherent defects among which the following are the most conspicuous:—Will not mix with dry colors containing lead carbonate without the mixture hardening. Lose luster after exposure to climatic influences. Frequently sag and flow after having been applied. Frosting in extreme cold weather. Blooming by exposure to a damp atmosphere or to water. Cracking by expansion or contraction due to alternation of heat and cold. Darkening in color after being applied. Solubility (partial) in alcohol, after applying and drying. We have found it possible to substantially eliminate these defects by avoiding the gums and resins as now employed, and using therefor a product made from a base comprised of a combination of a metallic soap with a metallic oxid, and soluble in appropriate varnish oils.

In searching for one of the ingredients of the primary base designed to act as a substitute for resinous bodies, we found that a substance known generically as aluminum soap possessed certain desirable characteristics as a physical substance, as well as the necessary chemical peculiarities for entering into combination with the other ingredients constituting what we have designated as a primary varnish base.

A specific example of an aluminum soap, and the process of preparing it is as follows:—We boil together, say linseed oil, with caustic soda, until the alkali has been absorbed, combined with, and neutralized by the fatty acids. To this neutral body, we then add the double sulfate of aluminum and soda, that is common alum. This yields a precipitated product which may be identified as a linoleate of aluminum, or aluminum soap. This product, when isolated and cleaned is found to be a gummy, plastic body, having luster, drying properties, and other qualities demanded in a varnish base, but unlike a resinous body, this aluminum soap is of uniform consistency, stable in character, elastic, and has a superior luster. In fact, we have discovered that various other metallic soaps formed from the metals of the aluminum group, are also available as ingredients for the varnish base, and we do not desire to be limited to the aluminum soap except where the same is specifically claimed.

The metals for forming the metallic soap with which we have produced the best results are chiefly aluminum, iron and chromium, which appear to have the same properties for this purpose, but render slightly different colored varnishes. The aluminum soap is, however, almost colorless, and therefore peculiarly suitable for lighter varnishes where no staining is desired, and also on account of its colorless characteristic, it forms a most suitable medium for the mixing of pigments, where lithographers' ink is to be produced. These metallic soaps are also readily soluble in turpentine, or other analogous carriers commonly used as varnish ingredients, such as coal tar benzol, carbon tetrachlorid, kerosene and the like.

If we desire to manufacture the varnish direct, the next step is to dissolve, say the aluminum soap in the oil of turpentine, or its equivalent. The product thus formed is a gelatinous substance, of viscous consistency, substantially colorless, and possessed of desirable varnish making characteristics, without the undesirable characteristics of resinous varnishes, while it has certain additional and valuable characteristics, new in varnishes, which will be later detailed. The function of this solvent is that of a medium for bringing the metallic soap into intimate contact with the other component from which the primary liquid varnish is formed. To incorporate this jelly-like aluminum soap into suitable liquid varnish form of proper consistency, we next combine it with a metallic oxid in the presence of water. An instance of such metallic oxid is magnesium oxid, which will combine with or dissolve into the solution of aluminum soap if they are heated together in the presence of water. Preferably however, we use hydrated oxids of alkaline earth metals, such as hydrated oxid of calcium. Whereas the normal metallic soaps of most of the metals are neutral bodies, we have discovered that the metallic soaps of the aluminum group of metals have acid characteristics, in fact, they exhibit the characteristics of a single acid in their reactions, and, therefore, this component seemingly has the capacity of entering into a chemical combination with any metallic base, accepting the conventional definition of a metallic base as an element or combination thereof capable of chemical reaction with an acid. The term "metallic base" is therefore of generic significance, whereas, the term an oxid of the alkaline earth metals has specific significance. In practice, we have found that the metallic soaps, characterized by this acid reaction, yield the best results when combined with members of the alkaline earth group of metals, or the oxids or hydrates thereof. For instance, a magnesium oxid or a calcium or barium hydrate yield substantially like products, differing slightly in color characteristics. A liquid varnish thus formed is primarily characterized by an absence of resinous substances and it is formed by a chemical combination of a metallic soap, or a solution thereof, having an acid reaction, and preferably from a selected member of the aluminum group of metals, with a metallic base, and preferably a selected member of the alkaline earth group of metals, this product being soluble in a suitable carrier, such as linseed oil. It is to be understood that when the solution of aluminum soap, for instance, is chemically combined with hydrated calcium oxid, for instance, the resultant product is a liquid varnish and the linseed oil is used as a diluent to form a commercial varnish of the desired consistency.

The hydrated calcium oxid of course contains the water of chemical combination, and in a dry powdered consistency, it is heated with the solution of aluminum soap.

A remarkable physical transition takes place, that is, the jelly-like, turpentine solution of the aluminum soap enters into a liquid solution with the hydrated calcium oxid, constituting one of the species of the liquid varnishes which it is the object of this invention to produce. We have also reached the conclusion based upon analytical and research work that a chemical reaction takes place, the union resulting in a colorless relatively thin liquid which is a superior varnish when the water has been eliminated by evaporation. This liquid frequently contains some impurities in the nature of silicious matter from the lime, and occasionally some carbonates, so that we preferably filter the liquid to obtain a clear, fixed varnish.

This varnish is so light in color that it is desirable for wood-work, or other characters of varnishing in which a minimum of staining effect is desired. For preparing a varnish to be combined with pigments, that is to say a lithographer's ink, we preferably combine the solution of aluminum soap with hydrated oxid of magnesium. The varnish thus formed my be generically considered as one product, susceptible of embodiment in a variety of species, depending upon the component of the metallic soap, as well as upon the metallic oxid component combined therewith. Thus, to produce a series of darker, or staining varnishes, we can form the metallic soap, say of a ferric oxid, or chromium oxid, which metallic soaps likewise possess the capacity of going into solution, due to the process of chemical reaction, to the best of our belief, with the hydrated oxids of alkaline earth metals. Thus the species may be elaborated by those skilled in the art, in the light of the disclosures herein, producing liquid varnishes having varying color values, but all being produced in substantially the same way and having substantially the same physical characteristics and superior varnish qualities. The metallic soaps of the aluminum group of metals will not, of course, combine with or form solutions with oxides of the same group of metals. The varnish thus formed is stable in character, has superior flowing qualities, and is elastic, so that the varnish does not crack or blister when dried and exposed to the elements. Furthermore, it is of uniform consistency, works well under the brush, has a high luster when dry, takes on a superior finish when burnished, is not soluble in alcohol when dry, and will not soften or run on exposure after it is dried, and in short, it is not subject to the various physical and chemical changes which are characteristic in varnishes formed of a resinous base. It is also cheaply and easily manufactured.

For some commercial purposes, it is desirable to make a primary varnish base as an article of commerce instead of manufacturing the varnish direct, as above described. Our invention also comprehends this product in process. The advantage of this discovery is, that we can produce a primary varnish base of condensed form, non-liquid in consistency, containing no inflammable oils, and which can be cheaply shipped to remote points directly to the users, or merchants, so that it can be converted into a varnish at its destination by simply dissolving it in the oil of turpentine, or other analogous varnish oil commonly recognized as an acceptable substitute therefor. For the purpose of producing this article of commerce for such purpose, we directly combine the metallic soap with the metallic oxid, notatably the hydrated oxids of alkaline earth metals. For instance, we can combine the aluminum soap directly with the hydrated calcium oxid, producing thereby a primary varnish base, consisting of a condensed adhesive paste, readily soluble in turpentine. For instance, to produce a hundred pound quantity, six and two-thirds pounds of the dry hydrated calcium oxid would be used. This product, irrespective of its diversity of species, constitutes generically a primary varnish base just as the varnish, irrespective of its diversity of species, constitutes generically a liquid varnish product.

While the proportion is not of the essence of the discovery, we will describe one of the quantitative embodiments of the process, which we have found to yield best results, and which will suffice to disclose to those skilled in the art a practical working basis for producing the varnish. One hundred pounds of linseed oil is mixed with a solution of caustic soda in such amount as to carry 13.7 pounds of sodium hydroxid, the preferable amount of water being between twenty-five and forty pounds. This mixture is heated in a bath of hot water or of steam for two hours or less, or until the alkali has been entirely absorbed, combined with and neutralized by the fatty acids of the oil. This neutral product is dissolved in water to obtain a dilute solution, preferably weighing about ten thousand pounds, i. e., containing not over one per cent. of oil. Sixty to sixty-five pounds of the double sulfate of aluminum and sodium, or other alum, or of its equivalent in any water-soluble salt of aluminum, is dissolved in water to obtain a weak solution, containing preferably 0.05% and not above 0.10% aluminum. The oil solution is poured into the aluminum solution, the mixing liquids being stirred rapidly and constantly during the operation. After the aluminum soap has settled, the supernatant liquor is drawn off, the soap is washed until externally free from the excess alum, then squeezed out thoroughly, suspended in hot water to soften it and kneaded in successive portions of hot water or until all but traces of the excess of aluminum salts has been removed. The washed soap is freed from water by squeezing and rolling and is then suspended in its own weight or in a sufficient quantity of turpentine, the mixture being heated and stirred to evaporate the remainder of the inclosed water. This product is a very viscous or jelly-like solution and is next treated with a pasty or creamy mixture of 3.6 pounds of magnesia and five to ten pounds of water. By heating, the magnesia dissolves completely in the aluminum soap solution, combining with the soap to form, after evaporation of the water, a clear solution, of the consistency of varnish and of similar and superior flowing qualities. This product can be used in this state, but is best used after addition to a suitably prepared linseed oil, such as a partially oxidized or "blown" oil.

Other drying, semi-drying or non-drying oils may be used, and may yield parallel products; in place of magnesia, may be used lime, baryta or strontia, preferably in the state of dry hydroxid, or the alkali metal hydroxids, potash and soda, or the oxids of other metals together with water or as hydroxids, or mixtures of them may replace the magnesia, or the carbonates of the respective bases may be used. The dry hydroxids of the suitable metals are preferable, as solution and combination with the aluminum soap take place most rapidly and completely. It is also preferable, when hydrates of the alkali earth metals are used, to evaporate off the water of reaction so as to produce an anhydrous varnish product.

The quantity of magnesia used in the above formula is that which will combine with one-half of the total fat acids of the linseed oil to form a normal magnesia soap. We have found, in the case of most of the bases used for the purpose above described, that the most serviceable and desirable products have this composition, the added hydroxid being in such proportions as to form a normal soap with one half of the total fat acids contained in the aluminum soap. But considerable variation is possible and in some cases desirable. Thus, in the instance of potash, the amount necessary to liquefy the firm, jelly-like solution of one part of aluminum linoleate in one part of turpentine is sufficient to combine with but one-sixth of the linseed oil fat acids present; while three times this amount can be combined, the products being generically the same, but constituting different species.

While we have called this new product a varnish, it has been found useful as an electric insulation as a substitute for oils in the manufacture of paints, and for various other analogous uses.

We have also found by experience and practical working tests in lithographic presses, that these varnishes have a very extensive field of utility in the lithographic art. The lighter or colorless varnishes, such as the aluminum soap and calcium oxid product combine readily with pigments, and the superior working qualities of the liquid is of especial advantage when applied to the rollers and stones of presses. It does not penetrate the paper as ordinary lithographers' inks do, and, therefore, imparts a high luster and an embossed effect to the lithographic products.

Of course, we do not limit ourselves to any particular fields of application, the term "varnish" being used in its generic sense, as covering various fluids of like general character and usage, such as inks, pigments, paints, stains or enamels.

Having described our invention, we claim:—

1. A new article of manufacture, consisting of a liquid comprising a solution of aluminum soap with a metallic base.

2. A new article of manufacture, an anhydrous liquid varnish comprising a solution of aluminum soap with an oxid of an alkaline earth metal.

3. A varnish product comprising a liquid resulting from the solution of metallic soap with a metallic base having the property of entering into solution therewith, the said substances constituting the essential varnish base and said solution being reduced to proper fluid consistency by suitable varnish dilutant carrier.

4. A varnish product comprising a liquid resulting from the solution of an oil, metallic soap, and a base having the properties of dissolving therein.

5. A varnish comprising a liquid solution of a metallic soap of aluminum and an oxid of an alkaline earth metal, characterized by an absence of organic resins or gums.

6. The herein described process of forming a varnish which consists in forming a solution of metallic soap with a metallic base, having the property of dissolving therein and reducing the same to proper fluid consistency by adding a varnish carrier.

7. A liquid varnish characterized by an absence of gums or resins, comprising a solution of a metallic soap and a base, the metal of which belongs to a group other than that of which the soap metal is a component, the said soap and base having the property of forming a liquid when heated together.

8. A liquid varnish characterized by an absence of gums or resins, comprising a solution of a metallic soap of aluminum and a metal of another group.

9. A liquid varnish characterized by an absence of gums or resins comprising a solution of a metallic soap of aluminum and an hydrated alkaline earth metal, the water of reaction having been eliminated to constitute a substantially anhydrous varnish product.

10. A primary varnish base comprising a solution of a metallic soap of aluminum with a metallic base, reduced to substantially solid form by evaporation, said product being soluble in a conventional varnish carrier.

11. A primary varnish base comprising a solution of an aluminum soap with an oxid of the alkaline earth metals, reduced to substantially solid condition and soluble in a suitable varnish carrier.

12. A primary varnish base comprising a solution of a metallic soap of aluminum with a metallic base, reduced to substantially solid form by evaporation and soluble in a suitable varnish carrier.

13. A liquid varnish characterized by an absence of gums or resins, and comprising a solution of a chemical union of a metallic soap of aluminum and a base, the metal of which belongs to a group other than the aluminum group.

14. A liquid varnish characterized by an absence of gums or resins and comprising a solution of a chemical union of a metallic soap of aluminum and an oxid of the alkaline earth metals.

15. A liquid varnish comprising a chemical union of a metallic soap having an acid characteristic, with a metallic base.

16. A liquid varnish comprising a chemical union of a metallic soap having acid characteristics with a metal hydroxid.

17. The process of making liquid varnish which consists in chemically uniting a metallic soap having an acid characteristic, with a metal hydroxid, and eliminating the water of combination liberated by the reaction.

18. A varnish characterized by the absence of gums and resins, and comprising a solution of a varnish base consisting of a metallic soap of a gummy, plastic uniform consistency, having luster, elasticity and drying properties, and having the property of dissolving readily with varnish solvents to form a liquid freely flowing under the brush and insoluble in alcohol when dry.

In testimony whereof, we have hereunto set our hands.

ALFRED B. WALKER.
FRANKLIN P. WALKER.

Witnesses:
OLIVER B. KAISER,
EMMA SPENER.